(12) United States Patent
Cropley et al.

(10) Patent No.: US 9,718,410 B2
(45) Date of Patent: Aug. 1, 2017

(54) ASSEMBLY FOR CONNECTING A ROOF RACK TO A VEHICLE

(71) Applicant: Rhino Rack Australia Pty Limited, New South Wales (AU)

(72) Inventors: Richard Oswald Cropley, New South Wales (AU); Christopher John Murty, New South Wales (AU); Michael John Laybourne Hort, New South Wales (AU)

(73) Assignee: Rhino Rack Australia Pty Limited (AU)

( * ) Notice: Subject to any disclaimer, the term of this patent is extended or adjusted under 35 U.S.C. 154(b) by 0 days.

(21) Appl. No.: 14/932,026

(22) Filed: Nov. 4, 2015

(65) Prior Publication Data

US 2016/0229349 A1 Aug. 11, 2016

(51) Int. Cl.
*B60R 9/04* (2006.01)
*B60R 9/06* (2006.01)
*B60R 9/05* (2006.01)
*B60R 9/052* (2006.01)
*B60R 9/058* (2006.01)

(52) U.S. Cl.
CPC .................. *B60R 9/058* (2013.01)

(58) Field of Classification Search
CPC .. B60R 9/058; B60R 9/04; B60R 9/06; B60R 9/05; B60R 9/052
See application file for complete search history.

(56) References Cited

U.S. PATENT DOCUMENTS

| | | | | |
|---|---|---|---|---|
| 4,179,154 A | * | 12/1979 | Ingram | B60J 1/2008 296/91 |
| 4,245,764 A | * | 1/1981 | Kowalski | B60R 9/045 224/321 |
| 4,640,450 A | * | 2/1987 | Gallion | B60R 9/058 224/315 |
| 5,282,562 A | * | 2/1994 | Legault | B60R 9/058 224/326 |
| 5,306,156 A | * | 4/1994 | Gibbs | B60Q 1/302 224/315 |
| 5,423,466 A | * | 6/1995 | Moon | B60R 9/12 224/309 |
| 5,431,570 A | * | 7/1995 | Gibbs | B60Q 1/302 224/315 |

(Continued)

FOREIGN PATENT DOCUMENTS

EP 1472113 11/2004

*Primary Examiner* — Brian D Nash
(74) *Attorney, Agent, or Firm* — Skinner and Associates; Joel Skinner

(57) ABSTRACT

An assembly for releasably connecting a roof bar to a roof of a vehicle. The assembly includes a body which is affixed to the roof bar, a base which is affixed to the roof and has a receiving portion for receiving a portion of the body, a locking pin slidably engaged with the body and the base, and slidable along an axis between a locked position and an unlocked position. In the locked position, the locking in engages the body and the base. In the unlocked position, the locking pin engages the body or the base. The assembly also has an actuator movable along the axis to slide the locking pin between the locked position and the unlocked position, thereby selectively engaging the body with the base.

14 Claims, 6 Drawing Sheets

(56) References Cited

U.S. PATENT DOCUMENTS

| | | | | |
|---|---|---|---|---|
| 5,497,925 | A * | 3/1996 | Lumpe | B60R 9/04 |
| | | | | 224/309 |
| 5,624,266 | A * | 4/1997 | Gibbs | B60Q 1/302 |
| | | | | 224/315 |
| 5,979,723 | A * | 11/1999 | Tress | B60R 9/058 |
| | | | | 224/309 |
| 6,010,048 | A * | 1/2000 | Settelmayer | B60R 9/045 |
| | | | | 224/315 |
| 6,305,589 | B1 * | 10/2001 | Chimenti | B60R 9/045 |
| | | | | 224/321 |
| 6,845,893 | B2 * | 1/2005 | Nelson | B60Q 1/2611 |
| | | | | 224/322 |
| 6,905,053 | B2 | 6/2005 | Allen | |
| 7,328,823 | B2 | 2/2008 | Allen | |
| 7,328,824 | B2 | 2/2008 | Smith et al. | |
| 8,333,311 | B2 * | 12/2012 | Hubbard | B60R 9/045 |
| | | | | 224/320 |
| 2010/0084448 | A1 | 4/2010 | Fjelland et al. | |
| 2010/0237116 | A1 * | 9/2010 | Hubbard | B60R 9/04 |
| | | | | 224/309 |
| 2013/0200121 | A1 * | 8/2013 | Hubbard | B60R 9/045 |
| | | | | 224/320 |
| 2015/0239402 | A1 * | 8/2015 | Hubbard | B60R 9/04 |
| | | | | 224/321 |

* cited by examiner

ASSEMBLY FOR CONNECTING A ROOF RACK TO A VEHICLE

TECHNICAL FIELD

The present invention generally relates to assemblies for connecting roof racks to vehicles. In particular, the invention relates to an assembly for releasably connecting a roof bar to a roof of a vehicle.

BACKGROUND TO THE INVENTION

Roof racks are used to support a load above a roof of a vehicle, thereby increasing the cargo carrying capacity of the vehicle.

A roof rack typically comprises a roof bar (also known as a 'cross bar') connected between a pair of connector assemblies, commonly referred to as 'legs' or 'towers', connected to and arranged at opposed sides of a roof of a vehicle. The connector assemblies are often releasably connected to the roof to allow removal of the roof rack when not required. This is generally desirable as the roof rack affects the aerodynamics of the vehicle, resulting in fuel consumption increasing, it is therefore common for a user to remove the roof rack from the vehicle when the rack is not required to optimise fuel consumption efficiency.

Many different connector assemblies are available for releasably connecting a roof rack to a vehicle. For example, as many vehicles are manufactured with rails fitted along each side of the roof, a common connector assembly comprises a clamp mechanism for gripping the rail. It is typical for the clamp to be actuated by a rotatable handle, thereby allowing a user to remove the roof rack from the vehicle without requiring tools.

However, some vehicles do not have rails fitted above the roof and alternatively, have a groove or track formed in the roof which contains connectors for receiving fasteners. To attach a roof rack to such vehicles, it is common to affix a connector assembly in or to the track with fasteners, such as bolts or screws. Whilst this is generally a reliable method of securing a roof rack to the roof, it can prove inconvenient and time consuming to remove the roof rack after an initial installation, as this often requires the use of specific tools and is time consuming to access and remove each fastener.

Accordingly, it would be advantageous to provide a mechanism for releasably connecting a roof rack to a roof of a vehicle having a groove or track for receiving fasteners, or having similar mechanical fastener locations, that can be operated quickly and without requiring tools, thereby allowing the roof rack to be readily removed from the vehicle. Furthermore, it would be useful to provide a solution that avoids or ameliorates any of the disadvantages present in the prior art, or which provides an alternative to the prior art approaches.

SUMMARY OF INVENTION

According to one aspect of the invention, there is provided an assembly for releasably connecting a roof bar to a roof of a vehicle, the assembly comprising a body adapted to be affixed to the roof bar, a base adapted to be affixed to the roof and having a receiving portion for receiving at least a portion of the body, locking pin slidably engaged with one of the body and the base, and slidable along an axis between a locked position, where the locking pin engages the body and the base, and an unlocked position, where the locking pin engages one of the body and the base, and an actuator movable along the axis to slide the locking pin between the locked position and the unlocked position, thereby selectively engaging the body with the base.

Other aspects are disclosed.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present disclosure relates to an assembly for releasably connecting a roof bar to a roof of a vehicle, the assembly comprising a body adapted to be affixed to the roof bar, a base adapted to be affixed to the roof and having a receiving portion for receiving at east a portion of the body, a locking pin slidably engaged with one of the body and the base, and slidable along an axis between a locked position, where the locking pin engages the body and the base, and an unlocked position, where the locking pin engages one of the body and the base, and an actuator movable along the axis to slide the locking pin between the locked position and the unlocked position thereby selectively engaging the body with the base.

The disclosed assembly advantageously allows a roof bar to be readily removed from a roof of a vehicle which requires a roof rack to be affixed to the roof with fasteners, as the assembly includes a base which is affixable to the roof with fasteners and a body which is affixable to the roof bar and selectively engageable with the base. The engagement of the body with the base only requires an actuator to be moved along an axis, which can be performed without the need for tools. The disclosed assembly is therefore simple and quick to operate. Furthermore, the lack of complexity of the engagement mechanism provided in the assembly means it is able to be manufactured efficiently and at low cost.

Figure 1:
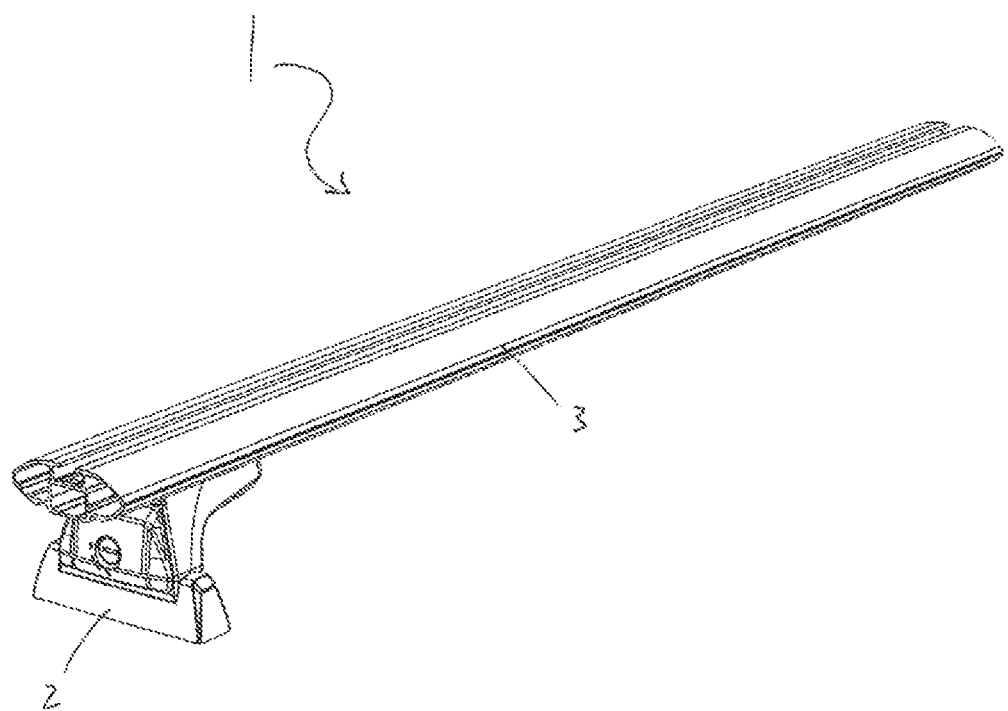
FIG. 1 is a perspective view of a roof rack assembly.

In FIG. 1 a roof rack assembly 1 is shown, comprising a connector assembly (leg assembly) 2 connected to an end of a roof bar 3. In use, the leg assembly 2 is affixed to a roof of a vehicle (not shown) with fasteners and supports the roof bar 3 above the roof. The roof rack assembly 1 would typically also include an additional leg assembly 2' (not shown) connected to an opposite end of the roof bar 3, thereby supporting the roof bar 3 between the pair of leg assemblies 2. A load (not shown), such as a roof box or bicycle, may then be supported on the roof bar 3 above the roof.

Figure 2:
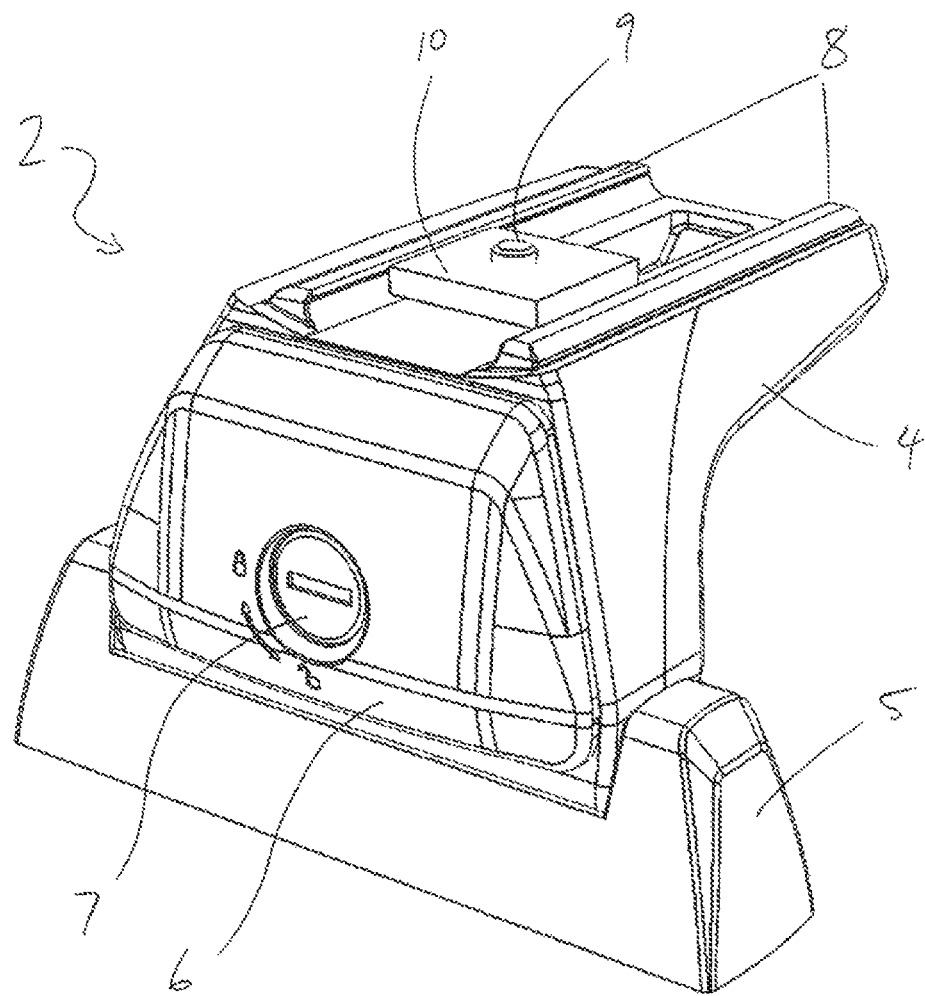
FIG. 2 is a perspective view of a leg assembly.

FIG. 2 shows the leg assembly 2 in isolation. The leg assembly 2 comprises a leg body 4 releasably connected to a base 5. The base 5 is secured to the roof of the vehicle by securing one or more fasteners (not shown), such as screws or bolts, therethrough and into complimentary fixtures, such as threaded inserts, embedded in a track (not shown) in the roof, or embedded directly in the roof. Alternatively, the base 5 may be formed integrally with the track.

The leg body 4 has a cover 6 releasably engageable therewith, such as by a lock mechanism 7, and is adapted to be affixed to the roof her 3. A top portion of the body 4 is shaped to receive and support the roof bar 3, the top portion including two rails 8 extending thereacross which are dimensioned to fit within respective grooves in the roof bar 3. The body 4 also has a fastener 9 affixed through the top portion and attached to a plate 10 which is dimensioned to be received within the roof bar 3. When the fastener 9 is tightened, the plate 10 is urged against the roof bar 3 and secures the body 4 to the roof bar 3.

Figure 3:
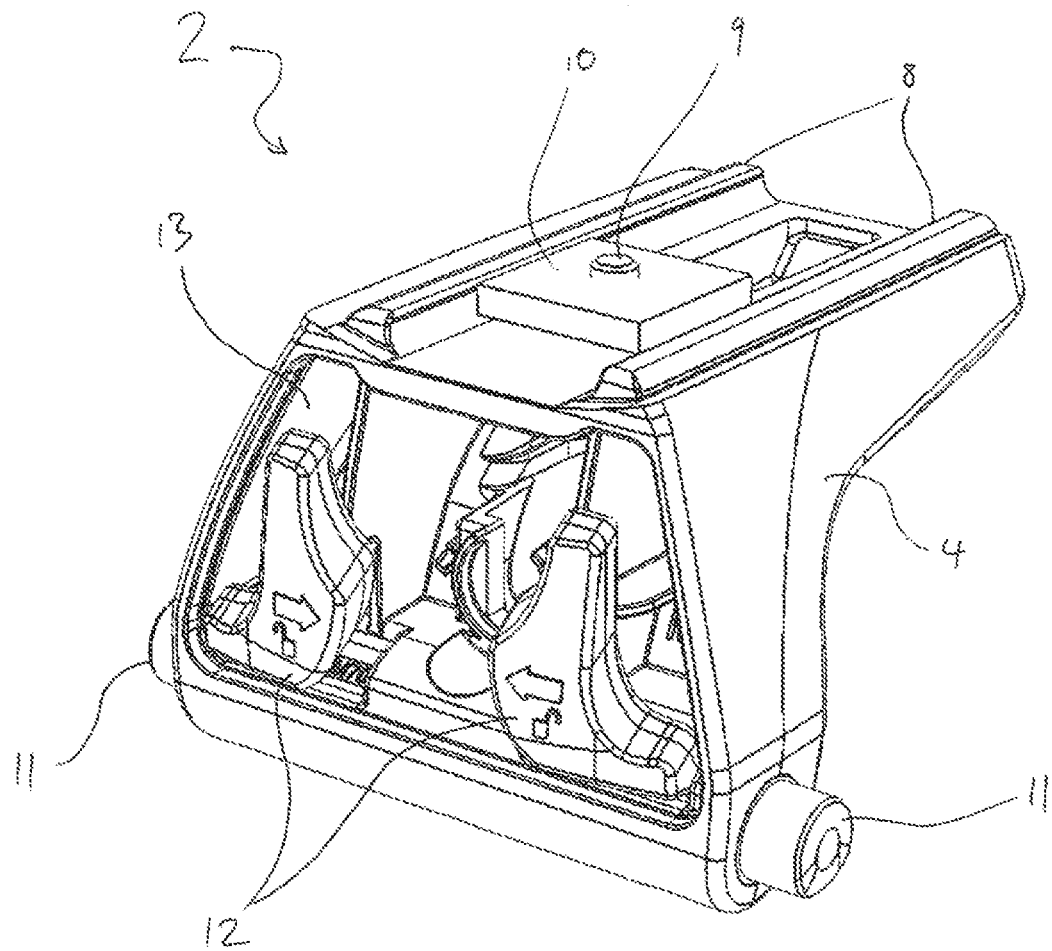
FIG. 3 is a perspective of the leg assembly shown in FIG. 2 with a cover removed.

In FIG. 3, the leg assembly 2 is she with the cover 6 and base 5 removed, exposing a pair of locking pins 11 projecting from either side of the body 4. A respective pair of actuators, being arms 12, extend from the pins 11 into a hollow portion 13 of the body. The locking pins 11 are slidably engaged with the body 4 and slidable along a common axis to releasably connect the body 4 to the base 5. The arms 12 are movable along the common axis to actuate respective locking pins 11, thereby allowing a user to slide the pins 11 between a locked position, where each pin 11 projects from the body 4 (as shown) and engages with an aperture in the base 5, and an unlocked position, where each pin 11 is retracted within the body 4. This allows the body 4 to be selectively engaged with the base 5.

Alternatively, the leg assembly 2 may include only a single locking pin 11 and associated actuator 12. For example, the body 4 may have a single locking pin 11 slidably engaged therewith and extending from one side (not shown) and a fixed projection extending from the other side (not shown). In this embodiment, the body 4 would be secured to the base 5 by initially inserting the projection into the base 5 with the locking pin 11 withdrawn into the body 4, and then engaging the locking pin 11 with the base 5.

Similarly, whilst the embodiment shown in FIG. 3 has an arm 12 connected to each locking pin 11, in an alternative embodiment (not shown) the leg assembly 2 may comprise a single arm 12 or other actuator which actuates both locking pins 12 simultaneously, thereby selectively engaging the body 4 with the base 5.

In a further alternative embodiment (not shown), the locking pins 11 are slidably engaged with the base 5 and the body 4 has apertures to receive the locking pins 11. In this arrangement, the locking pins 11 may be actuated by arms 12 joined to the locking pins 11 and arranged in the base 5. Alternatively, the locking pins 11 may be actuated by actuators arranged in the body 4 and indirectly connected to the locking pins 11. For example, arms 12 may be slidably enagaged with the body 4 and movable along a common axis to push the locking pins 11 into the base 5 and out of engagement with the body 4.

Returning to FIG. 3, the hollow portion 13 is dimensioned to receive and enclose each of the arms 12. The hollow portion 13 has an open front face, thereby allowing access to the arms 12 from the front of the body 4 only. The cover 6 is dimensioned to substantially seal the open front face, thereby preventing access to the arms 12 when the cover 6 is engaged with the body 4. In an alternative embodiment (not shown), the body 4 does not include the hollow portion 13 and instead, the arms 12 rest against a front face of the body 4 and are trapped between the cover 6 and the front face when the cover 6 is secured to the body 4, thereby preventing access to the arms 12.

Figure 4:
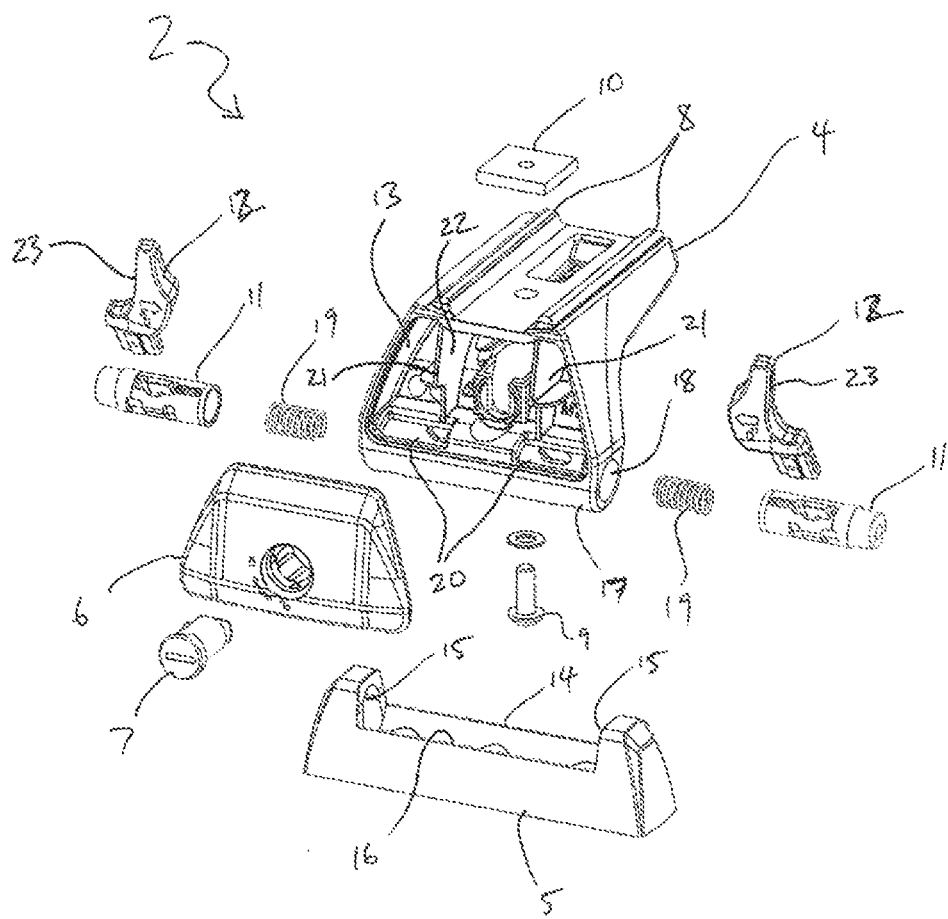
FIG. 4 is an exploded perspective view of the leg assembly shown FIGS. 2 and 3.

FIG. 4 shows an exploded view of the leg assembly 2 shown in FIGS. 2 and 3. The base 5 has a receiving portion 14 arranged in a top portion for receiving at least a portion of the body 4. The receiving portion 14 includes a pair of apertures 15 arranged in opposing side-walls, each aperture 15 dimensioned to receive one of the locking pins 11 when the locking pin 11 is arranged in the locked position and extended from the body 4. The receiving portion 14 further comprises a curved surface 16 having a complimentary shape to a curved surface 17 arranged along a base of the body 4. When the body 4 is engaged with the base 5, the curved surface 16 on the base 5 supports the curved surface 17 on the body 4. Each locking pin 11 has a cylindrical portion arranged at an end thereof which is received by the apertures 15. When the locking pins 11 are arranged in the locked position, this arrangement allows the body 4 to be rotated relative to the base 5 thereby allowing an associated roof bar 3 to be orientated relative to the roof of the vehicle.

The body 4 includes an aperture 18 extending into each side thereof, each aperture 18 dimensioned to receive the locking pin 11. Adjacent each locking pin 11 is a resiliently deformable member, such as a coil spring 19, which is positioned within the aperture 18 and arranged to be progressively compressed by the locking pin 11 when the locking pin 11 is moved towards the unlocked position. This arrangement ensures that the locking pin 11 is constantly urged towards the locked position, whereby an end portion of the locking pin 11 extends out of the aperture 18.

Each aperture 18 has a window 20 therein, through which the respective arm 12 is connected into the respective locking pin 11. The window 20 is dimensioned to allow the arm 12 to move a sufficient distance to ensure the locking pin 11 is retracted substantially within the body 4 in the unlocked position, thereby releasing the body 4 from engagement with the base 5.

The hollow portion 13 further comprises two ribs 21 extending thereacross, the ribs 21 defining a recess therebetween dimensioned to receive and retain the arms 12 when the locking pins 11 are arranged in the unlocked position. Furthermore, each rib 21 has an inner wall 22 dimensioned to abut a side-wall of a respective arm 12, when the respective locking pin 11 is arranged in the unlocked position. It will be appreciated that the recess defined between the ribs 21 may be provided by an alternative arrangement, such as an aperture (not shown) shaped to receive each arm 12. Similarly, the hollow portion 13 may retain the arms 12 when the locking pins 11 are arranged in the unlocked position by an alternative mechanism, such as a resiliently deformable tab (not shown) adapted to releasable engage one or more of the arms 12, or a projection (not shown) extending from the body 4 and adapted to abut and retain one or more of the arms 12.

Figure 5:
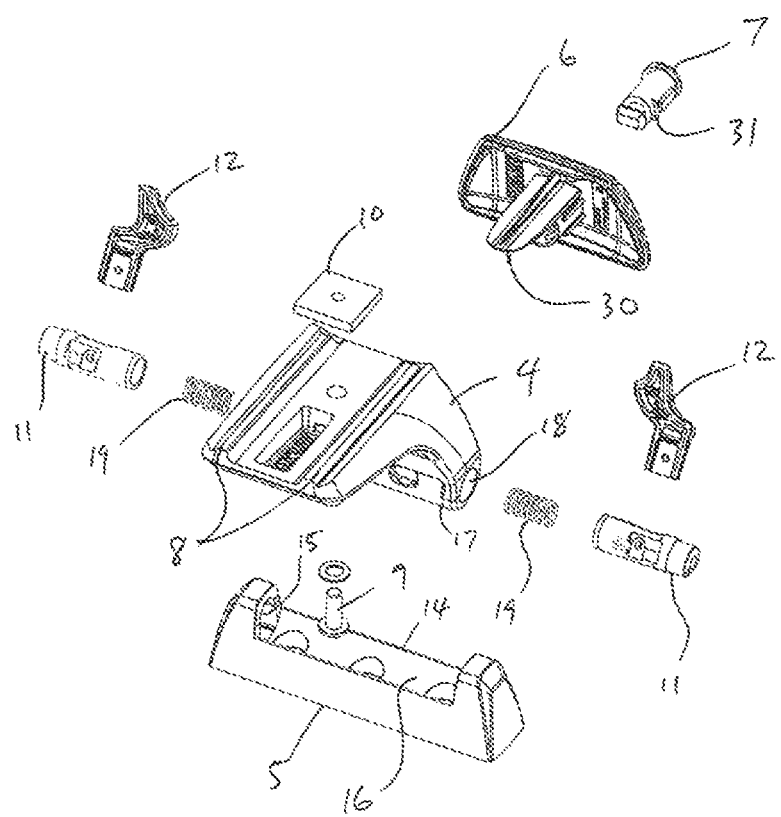
FIG. 5 is an alternative exploded perspective view of the leg assembly shown in FIGS. 2 to 4.

In FIG. 5, the leg assembly 2 is shown in the exploded arrangement from a rear perspective. The cover 6 has a projection 30 extending from a rear surface, the projection 30 dimensioned to abut at least one arm 12, when the locking pins 11 are arranged in the locked position. The lock mechanism 7 includes a lock shaft 31 extending from the cover 6 and which is received by an aperture in the body 4. The lock shaft 31 is rotatably connected to the cover 6 and rotatable from an unlocked position to a locked position, to selectively engage the cover with the body 4.

Figure 6:
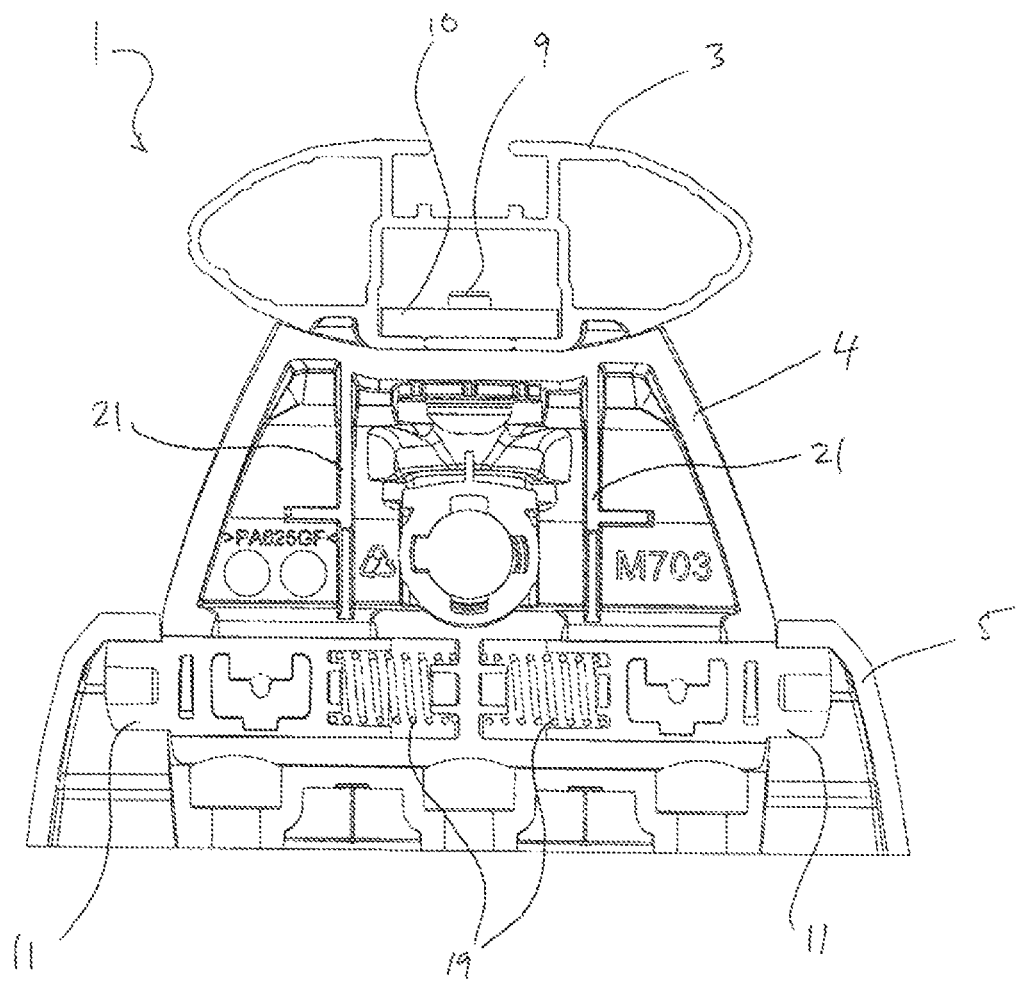
FIG. 6 is a cross-sectional front view of the roof rack assembly shown in FIG. 1.

FIG. 6 shows the roof rack assembly 1 in cross-section, where the section is arranged through a centre of the locking pins 11. The locking pins 11 are shown urged by the springs 19 into the locked position, thereby engaging the body 4 with the base 5.

It will be apparent that obvious variations or modifications may be made which are in accordance with the spirit of the invention and which are intended to be part of the invention. Although the invention is described above with reference to specific embodiments, it will be appreciated by that it is not limited to those embodiments and may be embodied in other forms.

The invention claimed is:

1. An assembly for releasably connecting a roof bar to a roof of a vehicle, the assembly comprising:
    a body adapted to be affixed to the roof bar;
    a base adapted to be affixed to the roof and having a receiving portion for receiving at least a portion of the body;
    a locking pin slidably engaged with one of the body and the base, and slidable along an axis between a locked position, where the locking pin engages the body and the base, and an unlocked position, where the locking pin engages either one of the body and the base and; and wherein the locking pin is slidably engaged with the body and the actuator is affixed to the locking pin, and wherein moving the actuator along the axis retracts the locking pin into the body, thereby disengaging the body from the base; and
    an actuator movable along the axis to slide the locking pin between the locked position and the unlocked position, thereby selectively engaging the body with the base, and wherein the actuator is an arm extending from the locking pin.

2. The assembly according to claim 1, wherein at least one of the body and the base is adapted to retain the actuator when the locking pin is arranged in at least one of the locked position and the unlocked position.

3. The assembly according to claim 1, wherein at least one of the body and the base further comprises a recess dimensioned to receive and retain the actuator when the locking pin is arranged in the unlocked position.

4. The assembly according to claim 1, wherein at least one of the body and the base further comprises a projection extending therefrom adapted to abut and retain the actuator when the locking pin is arranged in the unlocked position.

5. The assembly according to claim 1, wherein the locking pin is urged towards the locked position by a resiliently deformable member.

6. The assembly according to claim 1, wherein the locking pin has a cylindrical portion and one of the body and the base has an aperture dimensioned to receive the cylindrical portion, and wherein when the locking pin is arranged in the locked position the body is rotatable relative to the base about the cylindrical portion.

7. The assembly according to claim 1, wherein the locking pin is slidably engaged with the base and the actuator is affixed to the locking pin, and wherein moving the actuator along the axis retracts the locking pin into the base, thereby disengaging the body from the base.

8. The assembly according to claim 1, wherein the locking pin is slidably engaged with the base and the actuator is slidably engaged with the body and abuts the locking pin, and wherein moving the actuator along the axis pushes the locking pin into the base, thereby disengaging the body from the base.

9. The assembly according to claim 1, further comprising a cover having an engaging portion to releasably engage at least one of the body and the base, and wherein the cover is dimensioned to at least partially enclose the actuator when the locking pin is arranged in the locked position, thereby preventing access to the actuator.

10. The assembly according to claim 9, wherein the body has a hollow portion dimensioned to enclose the actuator and defines an opening, and wherein the cover is dimensioned to substantially seal the opening.

11. The assembly according to claim 9, wherein the cover has a projection extending therefrom dimensioned to abut the actuator when the locking pin is arranged in the locked position.

12. The assembly according to claim 9, wherein the cover has a lock shaft rotatably connected thereto and extending therefrom and the body further comprises an aperture dimensioned to receive the lock shaft, and wherein rotating the lock shaft within the aperture engages the cover with the body.

13. An assembly for releasably connecting a roof bar to a roof of a vehicle, the assembly comprising:
    a body adapted to be affixed to the roof bar;
    a base adapted to be affixed to the roof and having a receiving portion for receiving at least a portion of the body;
    a locking pin slidably engaged with one of the body and the base, and slidable along an axis between a locked position, where the locking pin engages the body and the base, and an unlocked position, where the locking pin engages either one of the body and the base and; and wherein the locking pin is slidably engaged with the body and the actuator is affixed to the locking pin, and wherein moving the actuator along the axis retracts the locking pin into the body, thereby disengaging the body from the base;
    a further, like locking pin slidably engaged with the body and movable along the axis by the actuator, and wherein moving the actuator along the axis slides both of the locking pins between the locked position and the unlocked position; and
    an actuator movable along the axis to slide the locking pin between the locked position and the unlocked position, thereby selectively engaging the body with the base.

14. An assembly for releasably connecting a roof bar to a roof of a vehicle, the assembly comprising:
    a body adapted to be affixed to the roof bar;
    a base adapted to be affixed to the roof and having a receiving portion for receiving at least a portion of the body;
    a locking pin slidably engaged with one of the body and the base, and slidable along an axis between a locked position, where the locking pin engages the body and the base, and an unlocked position, where the locking pin engages either one of the body and the base and; and wherein the locking pin is slidably engaged with the body and the actuator is affixed to the locking pin, and wherein moving the actuator along the axis retracts the locking pin into the body, thereby disengaging the body from the base;
    an actuator movable along the axis to slide the locking pin between the locked position and the unlocked position, thereby selectively engaging the body with the base; and
    a further, like locking pin slidably engaged with the body and movable along the axis, and a further, like actuator for sliding the further locking pin along the axis, and wherein moving the actuators towards each other along the axis slides the locking pins between the locked position and the unlocked position.

* * * * *